(12) United States Patent
Shah et al.

(10) Patent No.: US 10,048,777 B2
(45) Date of Patent: Aug. 14, 2018

(54) ADAPTIVE MAKE/BREAK DETECTION FOR A STYLUS TOUCH DEVICE

(71) Applicant: Apple Inc., Cupertino, CA (US)

(72) Inventors: Apexit Shah, Cupertino, CA (US); Ari Y. Benbasat, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 15/052,445

(22) Filed: Feb. 24, 2016

(65) Prior Publication Data

US 2017/0242500 A1    Aug. 24, 2017

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC .... G06F 3/03545; G06F 3/044; G06F 3/0414; G06F 3/04886
See application file for complete search history.

(56) References Cited

U.S. PATENT DOCUMENTS

| 8,928,635 | B2 | 1/2015 | Harley et al. | |
|---|---|---|---|---|
| 2013/0155018 | A1* | 6/2013 | Dagdeviren | G06F 3/03543 345/174 |
| 2016/0188110 | A1* | 6/2016 | Mohindra | G06F 3/044 345/174 |
| 2017/0123568 | A1* | 5/2017 | Takeda | G06F 3/0416 |

* cited by examiner

*Primary Examiner* — Abbas Abdulselam
(74) *Attorney, Agent, or Firm* — DLA Piper LLP US; Kristoffer W. Lange

(57) ABSTRACT

In one aspect, the present disclosure relates to a method and system for performing an adaptive make/break detection technique including adapting make and break thresholds based on the sum of all signals measured on display electrodes when the sum is lower than a respective filtered sum value. The filtered sum values are produced by a fast and slow filter, which correspond to the break and make thresholds respectively. By performing this method, the accuracy of detecting stylus touch-down and lift-off from a display can be improved, even in the presence of confounding factors such as variation in stylus manufacture, user grip, stylus angle, and water on the display.

19 Claims, 6 Drawing Sheets

ADAPTIVE MAKE/BREAK DETECTION FOR A STYLUS TOUCH DEVICE

FIELD

The present disclosure relates generally to touch screen devices compatible with active styluses.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device.

In general, touch screens can recognize a touch event and the position of the touch event on the touch sensor panel, and the computing system can then interpret the touch event in accordance with the display appearing at the time of the touch event, and thereafter can perform one or more actions based on the touch event. More advanced touch screens are capable of detecting multiple touches simultaneously. In general, touch screens can recognize the position of the one or more touches on the touch sensor panel, and a computing system can then interpret the touches, either individually or as a single gesture in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. Touch sensor panels may generally be configured to detect touches from a user's fingers, which generally have a surface area that contacts the touch sensor panel to disturb the stimulation signal sufficiently for touch location to be recognized.

When a stylus has been used as an input device in a capacitive touch system, the stylus has traditionally been finger-like in nature. A conventional stylus is often simply a conductive rod with a finger-sized rounded tip large enough to disrupt the electric field lines between the drive and sense electrodes of a capacitive touch sensor panel. As such, conventional styluses are passive input devices in that they are incapable of actively transmitting stimulus signals or sensing a touch-induced capacitance change in a capacitive touch sensor panel.

Another type of stylus, the active stylus disclosed in U.S. Pat. No. 8,928,635, incorporated herein in its entirety, acts as a drive and/or a sense element in a capacitive touch system. Unlike conventional styluses which work passively by blocking electric field lines between the drive and sense electrodes of a capacitive touch sensor panel, active styluses can either act as a drive electrode to create an electric field between the drive electrode and the sense lines of a mutual capacitive touch sensor panel, or as a sense electrode for sensing capacitively coupled signals from one or more stimulated drive rows and columns of the touch sensor panel or both. These styluses can be referred to as active styluses in comparison to conventional passive styluses. These active styluses can significantly improve stylus sensing on a mutual capacitive touch sensor panel without incurring significant additional cost. In particular, they can improve the positioning accuracy of the stylus.

SUMMARY

Embodiments of the present disclosure include methods and apparatus for detecting the making and breaking of stylus contacts. For example, the present disclosure may facilitate improved make/break detection, yielding a more accurate determination of stylus touch-down and lift-off and improved user experience with the stylus as a result.

In an embodiment of the present disclosure, stylus make/break detection may be performed by measuring a plurality of signals at a plurality of electrodes, adapting a make threshold based on a sum of the plurality of signals, adapting a break threshold based on the sum of the plurality of signals, and detecting stylus contacts being made and broken based on the sum of the plurality of signals, the make threshold, and the break threshold. In some embodiments of the present disclosure, detection may also include initializing a slow signal filter and a fast signal filter, applying the sum of the plurality of signals to the slow signal filter to produce a slow average, and applying the sum of the plurality of signals to the fast signal filter to produce a fast average. In at least some of these embodiments, the make threshold is adapted only when the sum of the plurality of signals is greater than a slow threshold value and less than the slow average. In some of these embodiments, the break threshold is adapted only when the sum of the plurality of signals is greater than a fast threshold value and less than the fast average. In some embodiments, the slow threshold value is a percentage of the slow average.

In further embodiments of the present disclosure, when a stylus angle is determined to be less than a maximum tilt angle and greater than a degradation boundary tilt angle, the sum of the plurality of signals is fuzzed prior to being applied to the slow signal filter and the fast signal filter. In some embodiments of the present disclosure, the make threshold is not adapted when a stylus angle is determined to be greater than a maximum tilt angle.

In some embodiments of the present disclosure, the make threshold and the break threshold are adapted when a stability score is below a predetermined threshold. In some embodiments of the present disclosure, adapting the make threshold comprises setting the make threshold to a percentage of the sum of the plurality of signals. In some embodiments of the present disclosure, the embodiment also includes setting the break threshold to a value lower than the make threshold when a stylus lift-off is detected and the break threshold is higher than the make threshold. In certain embodiments of the present disclosure, detecting a contact being made includes determining that a previous sum of the plurality of signals is lower than the sum of the plurality of signals and the sum of the plurality of signals is higher than the make threshold.

In some embodiments of the present disclosure, there is disclosed a touch screen device including a program memory containing program instructions and a display. The display may include a plurality of electrodes. In these embodiments the device also includes a processor, coupled to the program memory and the plurality of electrodes. The processor is configured to execute the program instructions, and the program instructions cause the processor to measure a plurality of signals at the plurality of electrodes, adapt a make threshold based on a sum of the plurality of signals, adapt a break threshold based on the sum of the plurality of signals, and detect stylus contact with the display being made and broken based on the sum of the plurality of signals, the make threshold, and the break threshold.

In some embodiments of the disclosure, the program instructions further cause the processor to initialize a slow signal filter and a fast signal filter, apply the sum of the plurality of signals to the slow signal filter to produce a slow average, and apply the sum of the plurality of signals to the fast signal filter to produce a fast average. In these embodiments, the make threshold may be adapted only when the sum of the plurality of signals is greater than a slow threshold value and less than the slow average. In certain embodiments of the present disclosure, the slow signal filter is an infinite impulse response filter. In certain embodiments of the present disclosure, the slow threshold value is 88% of the slow average. In certain embodiments of the present disclosure, when a stylus angle is determined to be less than a maximum tilt angle and greater than a degradation boundary tilt angle, the sum of the plurality of signals is fuzzed prior to being applied to the slow signal filter and the fast signal filter. In some embodiments, the sum of the plurality of signals is fuzzed by linearly interpolating the sum of the plurality of signals between 1 and a predetermined fuzz value according to the stylus angle when the stylus angle is between the maximum tilt angle and the degradation boundary tilt angle, wherein the predetermined fuzz value is greater than 0 and less than 1.

In some embodiments of the present disclosure, the make threshold and the break threshold are adapted when a stability score is below a predetermined threshold. In some embodiments, adapting the make threshold comprises setting the make threshold to a percentage of the sum of the plurality of signals.

In some embodiments, the program instructions further cause the processor to operate a state machine which maintains at least a touching state and a non-touching state. In certain embodiments of the present disclosure, the device transitions from the touching state to the non-touching state when the sum of the plurality of signals is less than the break threshold.

Other features and advantages will become apparent from the following detailed description and drawings.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DESCRIPTION

Figure 1:
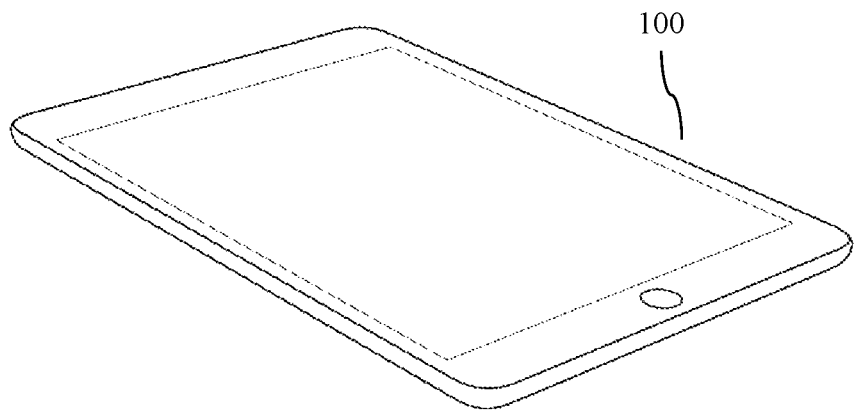
FIG. 1 shows a touch screen device in accordance with an embodiment of the present disclosure.

The present disclosure describes a touch-screen device that provides an improved detection of when a stylus is contacting the screen and when it is not contacting the screen. As a stylus is typically perceived as a more precise writing and drawing device than a fingertip, accurate detection of making contact (make) and losing contact (break) with the screen is important to providing performance to users that is similar to the pen and paper they may be accustomed to.

The concept of making and breaking contact is also relevant to touch sensors used with fingertips. However, because a fingertip is a less precise device than a stylus, users will tolerate greater inaccuracy in detection. In known touch sensor systems, detection of a touch may be performed by determining an electrode that represents the center of the touch contact and summing the signals from all electrodes on the panel to determine $Z_{tot}$, which is then adjusted by dividing $Z_{tot}$ by the mean radius of the patch of electrodes that are detected as part of the touch contact to determine the touch signal $Z_{den}$. $Z_{den}$ stands for Z-density, as it is the sum of the touch contact signal normalized by the radius of the touch contact electrode patch, which yields the density of signal present per unit distance.

Make and break detection in touch sensor systems can be performed by comparing the touch signal $Z_{den}$ to fixed threshold levels (for example, the make threshold may be 1 and the break threshold may be 0.65). If $Z_{den}$ goes above the make threshold, then the contact is made (and a touch begins to be registered). After making contact, if $Z_{den}$ goes below the break threshold, then the contact is broken (and touch is no longer registered). In known touch sensor systems, these thresholds are predetermined and fixed, and typically the break threshold is 65% of the make threshold. The use of a break threshold lower than the make threshold provides hysteresis so that, when the touch signal is very close to the make threshold, small variations in signal do not cause rapid making/breaking of the contact.

When such a make/break system is applied to an active stylus system, a number of disadvantages are experienced. For example, "hooking" can occur if the break threshold is too low to quickly sense stylus liftoff. In hooking, after a user draws a straight line a small hook will be present from the signal as the stylus lifts off of the panel. Another disadvantage is missed detections. If the make and break thresholds are set high to avoid hooking, then the make threshold may be too high to detect the beginning of contact, leading to the first portion of a line drawn by the user failing to be registered. Alternately, if the make threshold is left alone but the break threshold is set to a level that will avoid hooking and accurately detect stylus lift off of the panel (e.g., 95% of the make threshold), then small amounts of noise in the stylus signal can lead to rapid making and breaking of the stylus contact, resulting in random gaps in a drawn line. These errors, as well as others, lead to stylus input that is not perceived as accurate and provide a poor user experience.

In the present disclosure, a method and system is described in which an adaptive make/break detection technique for an active stylus may be performed. Using this technique, the make and break thresholds can be continuously modified and varied over time in order to compensate for factors resulting in variation of stylus signal such as variations in panel and stylus manufacture, the angle at which a user holds the stylus, the amount of force applied by a user, the grip of the user, the presence of water on the touch panel, and other contributors to variation in stylus signal. These factors may each individually cause a variation in total stylus signal of 5-20%, resulting in significant changes in stylus signal due to the combination of multiple factors, with the variation occurring both between users and while a specific user uses the stylus.

In the present disclosure, the make and break thresholds may be made independent of one another. By separating the make and break thresholds from one another, a break threshold that can more closely track stylus variation in order to provide a very accurate detection of when a user lifts the stylus can be provided while still providing a lower make threshold that can detect new contacts easily and will not erroneously miss new contacts.

In order to provide improved make/break detection, two different filtered total signal values ($Z_{tot}$) are tracked, which may be referred to as the fast $Z_{avg}$ and the slow $Z_{avg}$. Each is processed by filtering a series of $Z_{tot}$ samples through a filter. The filter may be any known architecture for a filter, such as an infinite impulse response ("IIR") filter or a finite impulse response ("FIR") filter. In some embodiments of the present disclosure, the filters are IIR filters. In some embodiments, the IIR filters can be first-order IIR filters that employ a forgetting factor $\alpha$ according to Equation 1:

$$y_t = (1-\alpha)^* y_{t-1} + \alpha^* x_t \qquad \text{(Eq. 1)}$$

In some embodiments, the fast filter uses $\alpha=0.001$, and the slow filter uses $\alpha=0.00003$.

The fast $Z_{avg}$ accounts for short-term variation in stylus signal from the factors described above and can be used primarily for break threshold adaptation, and the slow $Z_{avg}$ accounts for long-term variation in the nominal stylus signal for a particular sensor/stylus pairing and can be used primarily for make threshold adaptation. In some circumstances, the make threshold may actually drop below the break threshold temporarily in order to provide good stylus contact detection. The fast and slow $Z_{avg}$ values are used to adapt the make and break thresholds under specific conditions, such as when the stylus is touching the panel and stylus tilt is at less than 55 degrees from perpendicular to the panel.

Using this technique, stylus contact with the panel can be detected more accurately, such that both light and heavy touches are detected accurately at their inception and liftoff of the stylus from the panel is detected quickly, without any random gaps in the line while the stylus is in contact with the screen.

FIG. 1 shows an example of a touch screen device 100, such as a smartphone or tablet, as described in more detail herein. The touch screen device 100 may include one or more touch sensors, including a plurality of sense rows and columns for sensing stylus contacts.

Figure 2:
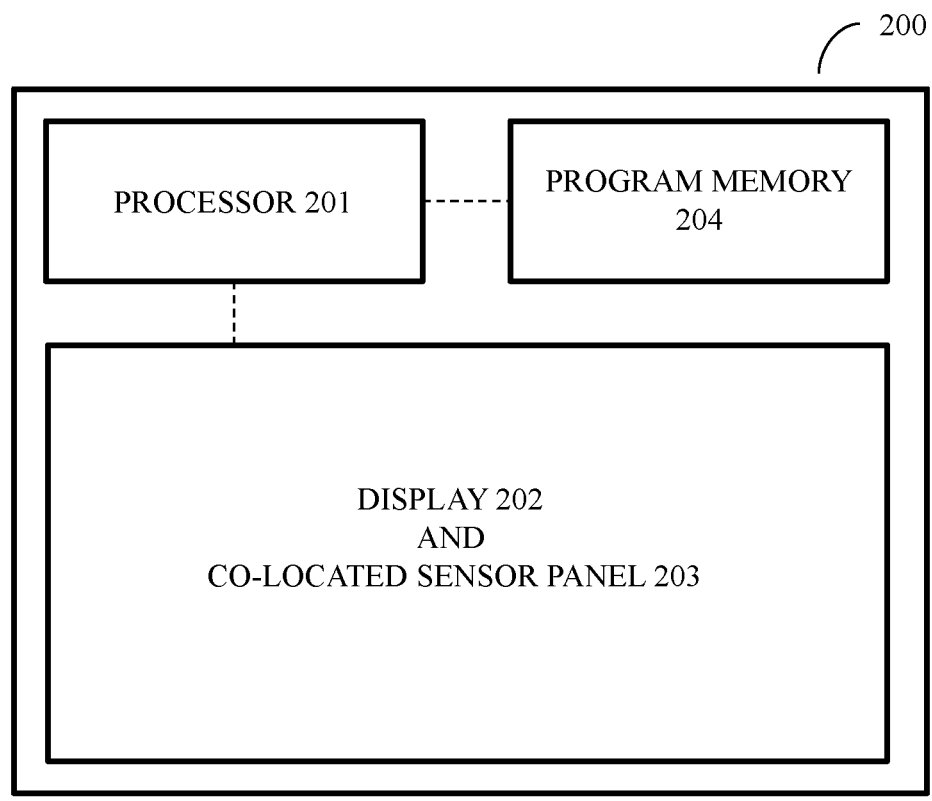
FIG. 2 shows components of a touch screen device in accordance with embodiments of the present disclosure.

FIG. 2 shows components of a touch screen device 200 in accordance with embodiments of the present disclosure. Device 200 includes a processor 201, a display 202, a sensor panel 203 which may be co-located with the display 202 and which may include a plurality of electrodes for sensing stylus contacts, and program memory 204.

Figure 3:
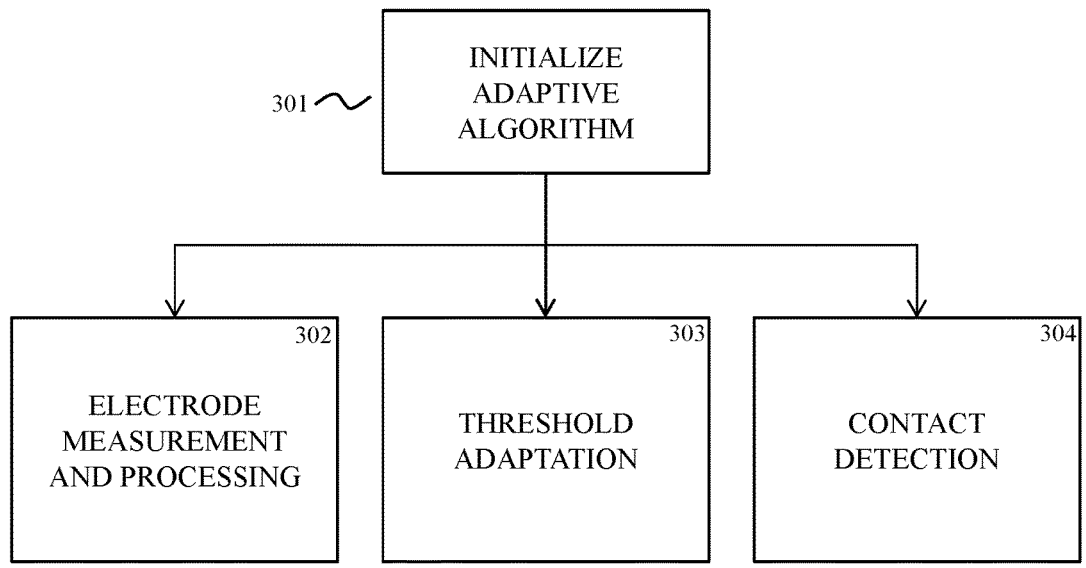
FIG. 3 shows an embodiment of a method according to embodiments of the present disclosure.

FIG. 3 shows an embodiment of a method according to embodiments of the present disclosure. In method 300, initialization 301 is performed, followed by electrode measurement 302, threshold adaptation 303, and contact detection 304. Electrode measurement 302 takes measurements of the sensing electrodes for further processing and updates signal filters, as described in more detail below with respect to FIG. 5 and FIG. 6. Threshold adaptation 303 performs processing of the filtered signals and may update the touch detection thresholds (e.g., stylus touch thresholds), as described in more detail below with respect to FIG. 7. Contact detection 304 applies the thresholds in order to perform detection of making and breaking contact with the display, as described in more detail below with respect to FIG. 8. Electrode measurement 302, threshold adaptation 303, and contact detection 304 may operate simultaneously, either by operating in parallel, alternating between performing the three, or performing some number of one or more of the functions 302, 303, and 304 followed by performing one or more other of the functions 302, 303, and 304. For example, ten electrode measurements 302 may be performed, followed by a threshold adaptation 303 and then a contact detection 304, after which the cycle may repeat. In embodiments of the present invention, steps 302, 303, and 304 may be performed repetitively until a new initialization is triggered (e.g., as an explicit calibration reset, pairing or unpairing of a stylus to a device, device lock or unlock, or other mechanisms.)

Figure 4:
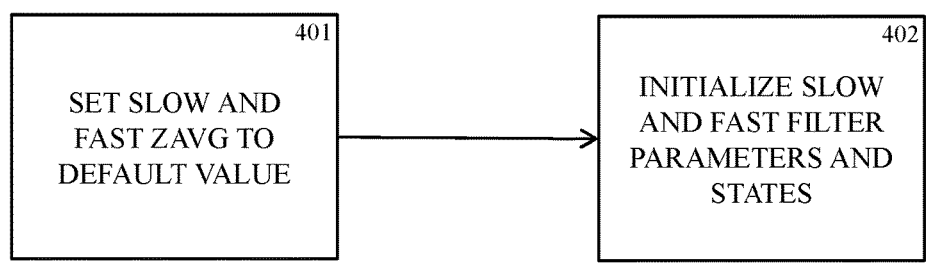
FIG. 4 illustrates a process of initialization according to some embodiments of the present invention.

FIG. 4 further illustrates a process of initialization according to some embodiments of the present invention. This process may, for example, be performed in step 301 of FIG. 3. In step 401, the slow $Z_{avg}$ and fast $Z_{avg}$ are each set to a default value. In some embodiments of the present disclosure, this default value is the same for both slow and fast $Z_{avg}$. In step 402, the slow and fast filter parameters are initialized and the filter state is set to an initial value. For example, in embodiments in which the filters are IIR filters employing a forgetting factor, as described above in Eq. 1, the $\alpha$ parameter is set to the appropriate rate and the filter accumulator is set to zero (e.g., $y_{t0}$ is set to zero.) These steps may be performed in the opposite order as that described above, as needed. Method 400 may be triggered by the mechanisms described above with respect to FIG. 3.

Figure 5:
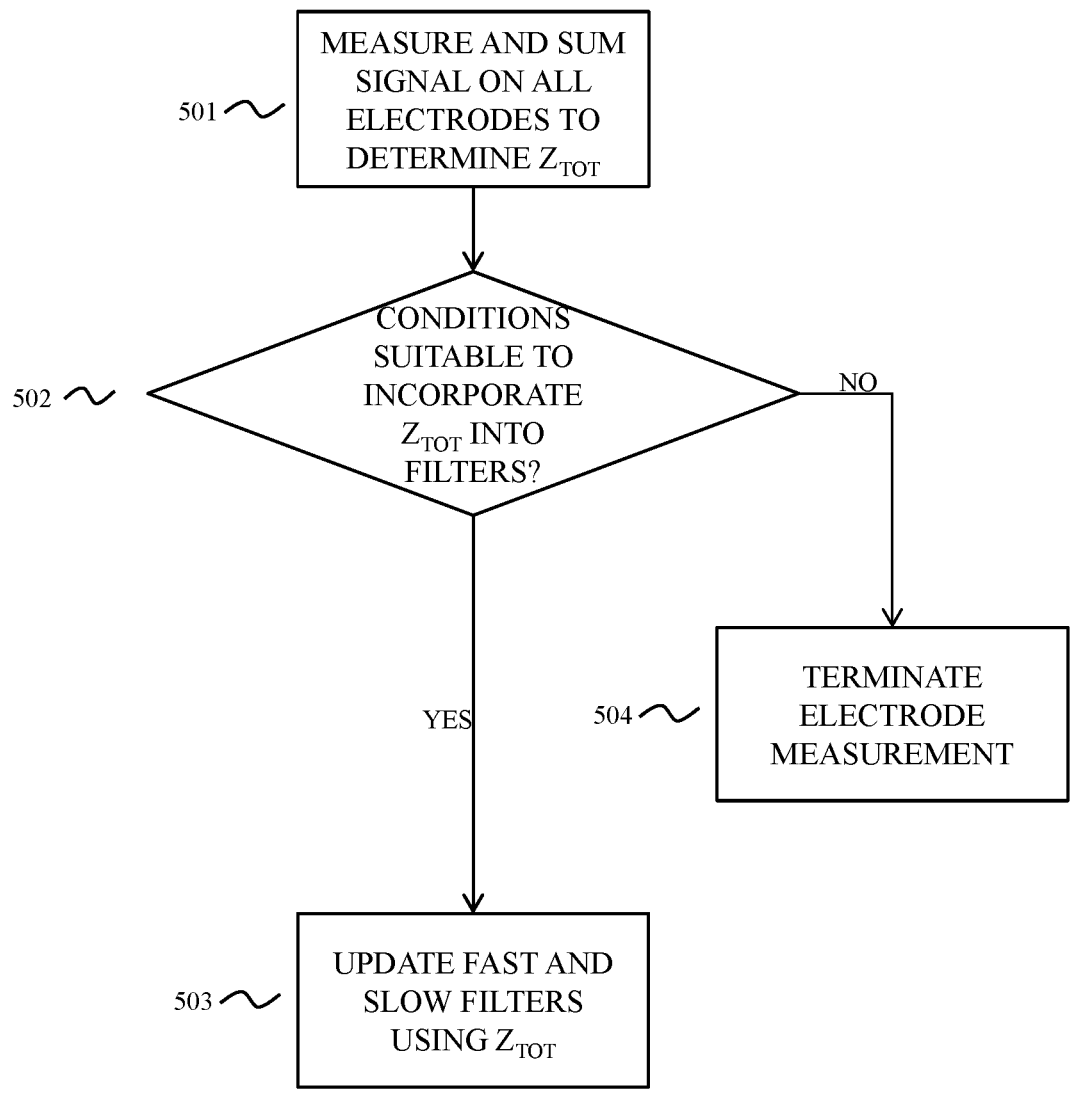
FIG. 5 illustrates a process of electrode measurement according to embodiments of the present invention.

FIG. 5 illustrates a process of electrode measurement according to embodiments of the present invention in further detail. This process may, for example, be performed in step 302 of FIG. 3. In step 501, the signal is measured at all electrodes on the panel and summed to determine $Z_{tot}$. In step 502, conditions are checked to see if the fast and slow filters should incorporate the new $Z_{tot}$. If the system is currently in "touching" state (i.e., a contact has been made and not yet broken) and the tilt angle of the stylus is less than $Z_{inflect}$ degrees from perpendicular to the panel, then the $Z_{tot}$ value is suitable to be used as a filter input. $Z_{inflect}$ is an angle at which Ztot begins to increase suddenly with increasing angle, and is dependent on the design of the stylus tip. In some styluses for use with embodiments of the present disclosure, this angle is between 50 and 60 degrees. In a stylus for use with certain embodiments of the present disclosure, the $Z_{inflect}$ angle is 55 degrees. If both conditions are met, then the process proceeds to step 503. Otherwise, it terminates at step 504. In step 503, the fast and slow filters update by incorporating the new $Z_{tot}$ sample.

Figure 6:
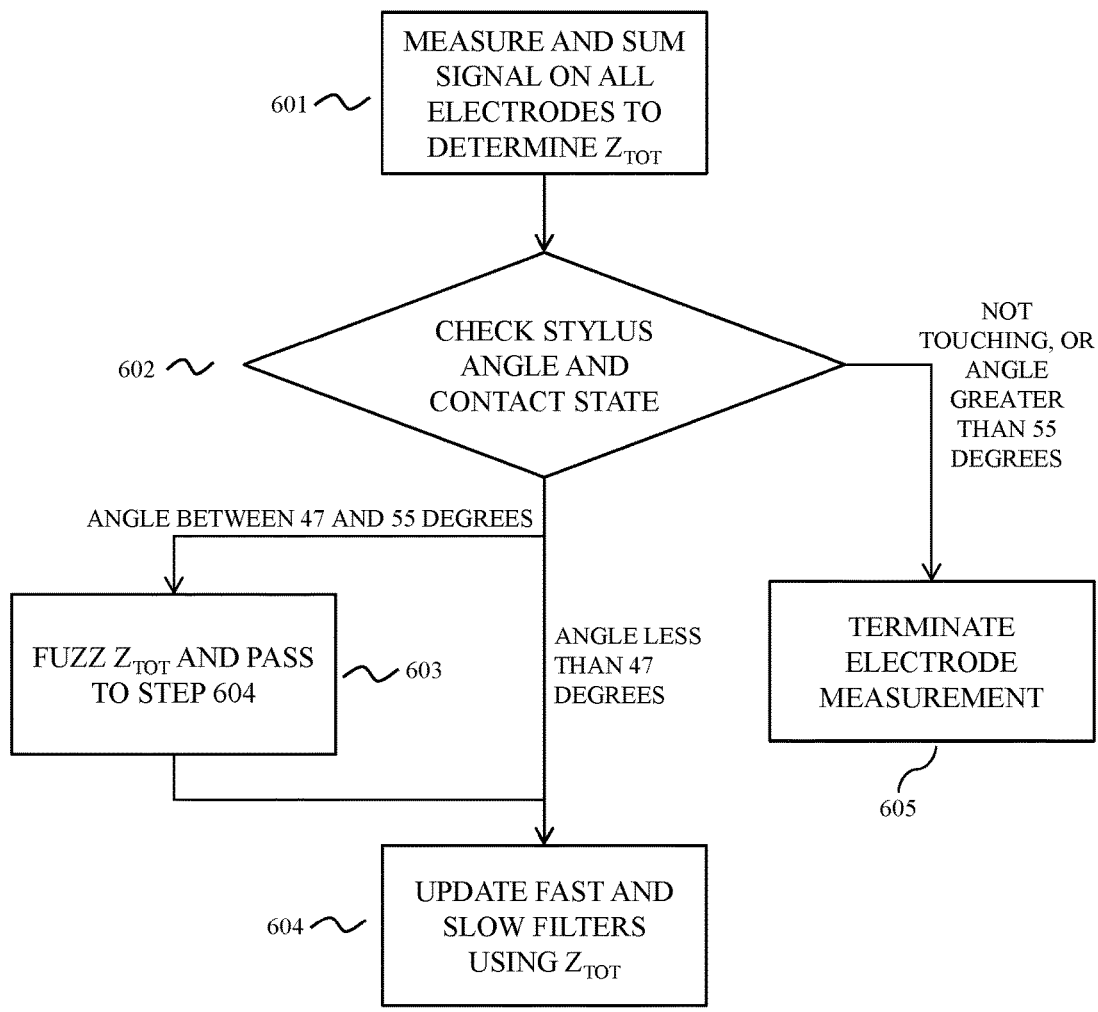
FIG. 6 illustrates an alternative process of electrode measurement according to embodiments of the present invention in further detail.

FIG. 6 illustrates an alternative process of electrode measurement according to embodiments of the present invention in further detail. This process may, for example, be performed in step 302 of FIG. 3, in place of the process shown in FIG. 5. In step 601, the signal is measured at all electrodes on the panel and summed to determine $Z_{tot}$. In step 602, the tilt angle of the stylus and the contact state of the stylus is checked. Depending on tilt angle and contact state, any of steps 603, 604, or 605 may be triggered.

If the tilt angle of the stylus is less than a maximum tilt angle (e.g., $Z_{inflect}$, such as 55 degrees), but is greater than a tilt angle at which accuracy begins to be degraded, which may be referred to as $Z_{degraded}$ (e.g., 47 degrees), and the stylus is touching, then the process continues with step 603. In step 603, the $Z_{tot}$ is "fuzzed", or linearly interpolated between 1.0 and 0.97 across the range of angles from 47 degrees (or $Z_{degraded}$) to 55 degrees (or $Z_{inflect}$). The fuzzed $Z_{tot}$ value is then used in step 604. Some embodiments of the present disclosure may linearly interpolate between 1.0 and a number other than 0.97, depending on the characteristics of the stylus signal and the stylus tip.

If the tilt angle is less than 47 degrees (or $Z_{degraded}$) and the stylus is touching, then the process continues with step 604 without fuzzing in step 603.

In step 604, the fast and slow filters update by incorporating the new $Z_{tot}$ sample. If step 603 was triggered (i.e., the tilt angle was between 47 and 55 degrees) then this will be the fuzzed $Z_{tot}$, otherwise the measured $Z_{tot}$ will be used.

If the stylus is not touching, or the stylus tilt angle is greater than 55 degrees, the process terminates in step 605.

Figure 7:
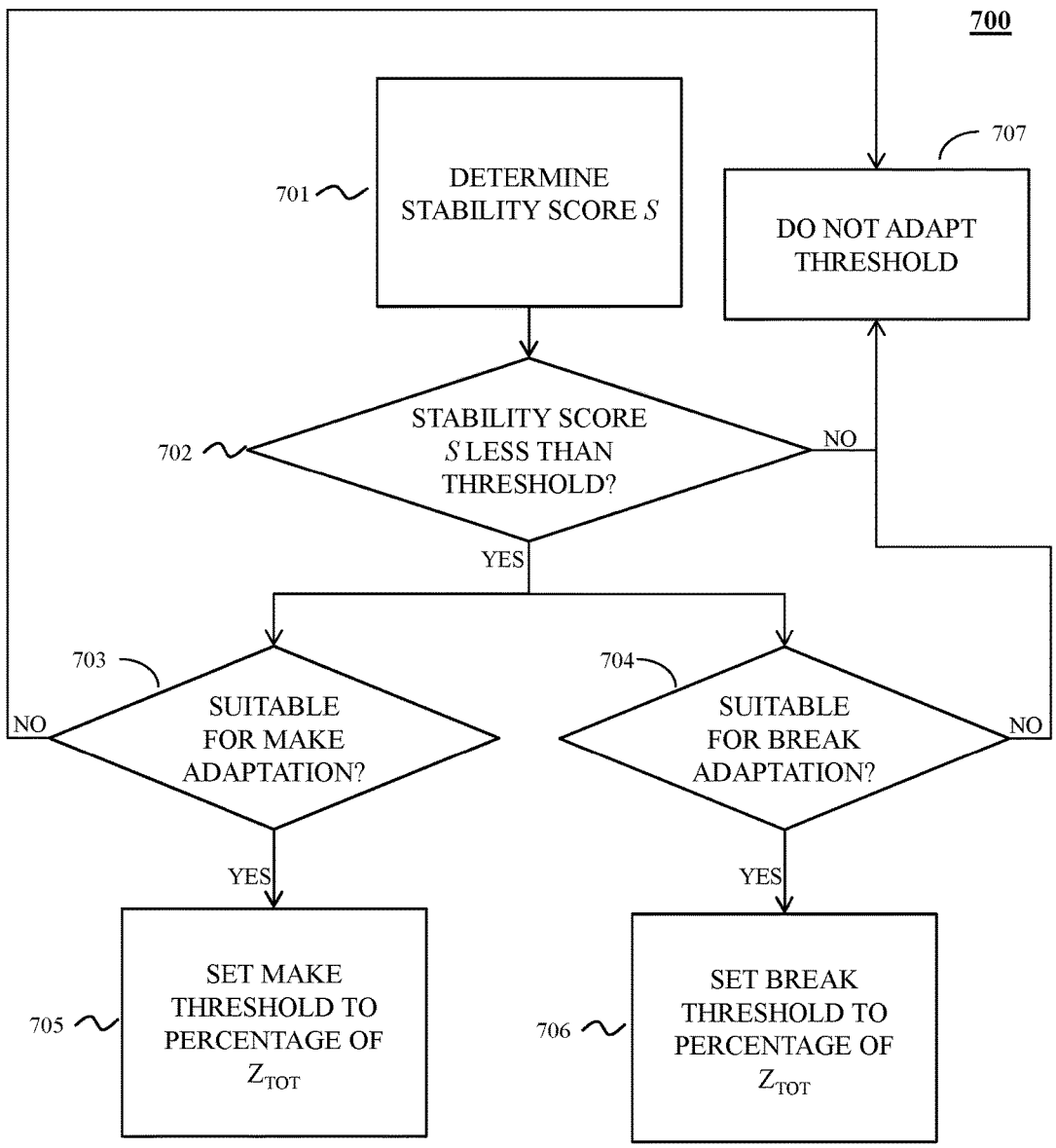
FIG. 7 illustrates a process of threshold adaptation according to embodiments of the present disclosure.

FIG. 7 illustrates a process of threshold adaptation according to embodiments of the present disclosure. This process may, for example, be performed in step 303 of FIG. 3. In step 701, a stability score is determined. The stability is represented by a stability score s, which is determined using Equation 2:

$$s = \sum_{n=0}^{max\_width} |PrevZtot(n) - Ztot| \quad \text{(Eq. 2)}$$

Stability score is the summation of the absolute differences between the current $Z_{tot}$ and the previous max_width number of $Z_{tot}$, stored in an array called PrevZtot, where each entry in the array represents a previous value of $Z_{tot}$ going backwards in time. Max_width is a flexible value determined based on how quickly $Z_{tot}$ is observed to change in normal writing and drawing use cases. In step 702, the stability score s is compared to a predetermined stability threshold. If s is less than the threshold, adaptation can proceed; otherwise, adaptation terminates in step 707. In step 703, $Z_{tot}$ is compared to the slow $Z_{avg}$ and to a predetermined percentage of the slow $Z_{avg}$. If s is less than the threshold, and $Z_{tot}$ is lower than the slow $Z_{avg}$ but higher than the predetermined percentage of $Z_{avg}$, then step 705 is triggered to proceed with make threshold adaptation. Otherwise, make adaptation terminates in step 707.

Similarly, in step 704, suitability for adaptation of the break threshold is determined. In step 704, $Z_{tot}$ is compared to the fast $Z_{avg}$. If the stability score s is less than a predetermined stability threshold and if $Z_{tot}$ is less than the fast $Z_{avg}$, but more than a predetermined percentage of the fast $Z_{avg}$, then step 706 is triggered to proceed with break threshold adaptation; otherwise, adaptation terminates in step 707. The predetermined percentages of the fast and slow $Z_{avg}$ used in steps 703 and 704 may be the same as one another or different. In some embodiments, the percentage may vary between 86% and 90%. In one embodiment of the present disclosure, both percentages are 88%. The percentage provides compensation for local variations in $Z_{tot}$ caused by variation sources such as heating of the panel, uneven thickness of panel glass, and uneven signal scale across the panel.

In either step 701 or 702, if the conditions are not met, the respective threshold is not adapted. In step 703, the make threshold is set to a predetermined percentage of the current $Z_{tot}$. Similarly, in step 704, the break threshold is set to a predetermined percentage of the current $Z_{tot}$.

Figure 8:
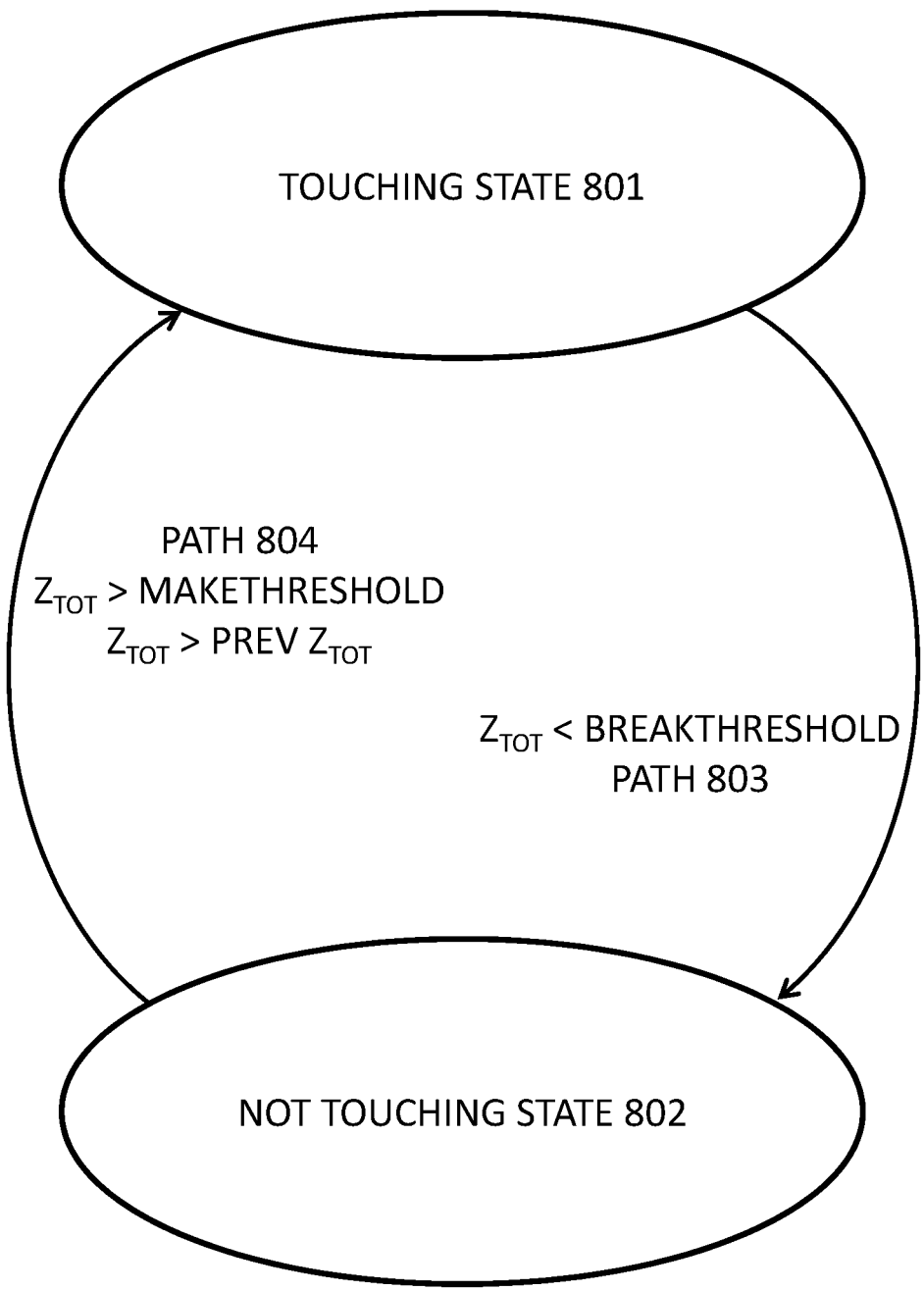
FIG. 8 illustrates a state machine representing a contact detection process according to embodiments of the present disclosure.

FIG. 8 illustrates a contact detection process according to embodiments of the present disclosure. This process may, for example, be performed in step 304 of FIG. 3. FIG. 8 is represented as a state machine. State 801 is a "touching" state, in which the stylus has been determined to be touching the panel. State 802 is a "not touching" state, in which the stylus has been determined not to be touching the panel.

Path 803 represents a state transition from "touching" to "not touching." Path 803 occurs when the current state is "touching" and current $Z_{tot}$ is less than the break threshold. If the conditions are met, a stylus lift-off is detected and the state transitions to "not touching" (state 802). Additionally, the break threshold is checked against the make threshold. If the break threshold is higher than the make threshold, the break threshold is set to a value lower than the make threshold. This prevents locking the device into a state in which paths will be made and immediately broken. However, this is only done when a lift-off is detected—the break threshold may be higher than the make threshold while the stylus is in a touching state without the break threshold being set to a lower value. In some embodiments, the break threshold is set to a predetermined percentage (e.g., 85%) of the make threshold.

Path 804 represents a state transition from "not touching" to "touching." Path 804 occurs when the current state is "not touching" and current $Z_{tot}$ is higher than the make threshold. Additionally, current $Z_{tot}$ has to be higher than the previous $Z_{tot}$, in order to avoid double tap detections when lifting off from a heavy stroke made with high force. If the conditions are met, a stylus touchdown is detected and the state transitions to "touching" (state 801).

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method of detecting making and breaking of stylus contacts, comprising:
   measuring a plurality of signals at a plurality of electrodes;
   initializing a slow signal filter and a fast signal filter, wherein the slow signal filter accounts for signal variation over a first time period and the fast signal filter accounts for signal variation over a second time period less than the first time period;
   applying a sum of the plurality of signals to the slow signal filter to produce a slow average;

applying the sum of the plurality of signals to the fast signal filter to produce a fast average;
adapting a make threshold based on the slow average;
adapting a break threshold based on the fast average; and
detecting stylus contacts being made and broken based on the sum of the plurality of signals, the make threshold, and the break threshold.

2. The method of claim 1, wherein the make threshold is adapted only when the sum of the plurality of signals is greater than a slow threshold value and less than the slow average.

3. The method of claim 2, wherein the break threshold is adapted only when the sum of the plurality of signals is greater than a fast threshold value and less than the fast average.

4. The method of claim 2, wherein the slow threshold value is a percentage of the slow average.

5. The method of claim 2, wherein, when a stylus angle is determined to be less than a maximum tilt angle and greater than a degradation boundary tilt angle, the sum of the plurality of signals is fuzzed prior to being applied to the slow signal filter and the fast signal filter.

6. The method of claim 2, wherein the make threshold is not adapted when a stylus angle is determined to be greater than a maximum tilt angle.

7. The method of claim 1, wherein the make threshold and the break threshold are adapted when a stability score is below a predetermined threshold.

8. The method of claim 1, wherein adapting the make threshold comprises setting the make threshold to a percentage of the sum of the plurality of signals.

9. The method of claim 1, further comprising setting the break threshold to a value lower than the make threshold when a stylus lift-off is detected and the break threshold is higher than the make threshold.

10. The method of claim 1, wherein detecting a contact being made comprises determining that:
a previous sum of the plurality of signals is lower than the sum of the plurality of signals; and
the sum of the plurality of signals is higher than the make threshold.

11. A touch screen device comprising:
a program memory containing program instructions;
a display, wherein the display comprises a plurality of electrodes;
a processor, coupled to the program memory and the plurality of electrodes, wherein
the processor is configured to execute the program instructions and the program instructions cause the processor to:
measure a plurality of signals at the plurality of electrodes;
initialize a slow signal filter and a fast signal filter, wherein the slow signal filter accounts for signal variation over a first time period and the fast signal filter accounts for signal variation over a second time period less than the first time period;
apply a sum of the plurality of signals to the slow signal filter to produce a slow average;
apply the sum of the plurality of signals to the fast signal filter to produce a fast average;
adapt a make threshold based on the slow average, wherein the make threshold is adapted only when the sum of the plurality of signals is greater than a slow threshold value and less than the slow average;
adapt a break threshold based on the fast average; and
detect stylus contact with the display being made and broken based on the sum of the plurality of signals, the make threshold, and the break threshold.

12. The device of claim 11, wherein the slow signal filter is an infinite impulse response filter.

13. The device of claim 11, wherein the slow threshold value is 88% of the slow average.

14. The device of claim 11, wherein, when a stylus angle is determined to be less than a maximum tilt angle and greater than a degradation boundary tilt angle, the sum of the plurality of signals is fuzzed prior to being applied to the slow signal filter and the fast signal filter.

15. The device of claim 14, wherein the sum of the plurality of signals is fuzzed by linearly interpolating the sum of the plurality of signals between 1 and a predetermined fuzz value according to the stylus angle when the stylus angle is between the maximum tilt angle and the degradation boundary tilt angle, wherein the predetermined fuzz value is greater than 0 and less than 1.

16. The device of claim 11, wherein the make threshold and the break threshold are adapted when a stability score is below a predetermined threshold.

17. The device of claim 11, wherein adapting the make threshold comprises setting the make threshold to a percentage of the sum of the plurality of signals.

18. The device of claim 11, wherein the program instructions further cause the processor to operate a state machine which maintains at least a touching state and a non-touching state.

19. The device of claim 18, wherein the device transitions from the touching state to the non-touching state when the sum of the plurality of signals is less than the break threshold.

* * * * *